United States Patent [19]

Pfefferle

[11] 4,276,203

[45] Jun. 30, 1981

[54] CATALYTIC SYSTEM AND PROCESS FOR PRODUCING IT

[75] Inventor: William C. Pfefferle, Middletown, N.J.

[73] Assignee: Acurex Corporation, Mountain View, Calif.

[21] Appl. No.: 33,705

[22] Filed: Apr. 26, 1979

[51] Int. Cl.$^3$ .................. B01J 21/04; B01J 23/10; B01J 23/58; B01J 23/64
[52] U.S. Cl. .................. 252/462; 252/461; 252/463; 252/466 PT; 252/467; 252/471; 252/472; 252/475; 252/477 R
[58] Field of Search .......... 252/462, 466 PT, 477 R, 252/461, 463, 467, 471, 472, 475

[56] References Cited

U.S. PATENT DOCUMENTS

| 3,362,783 | 1/1968 | Leak | 252/477 R |
|---|---|---|---|
| 3,565,830 | 2/1971 | Keith et al. | 252/466 PT |
| 3,615,166 | 10/1971 | Hindin et al. | 252/466 PT |
| 3,903,020 | 9/1975 | Sergeys et al. | 252/462 X |
| 3,931,050 | 1/1976 | Asano et al. | 252/477 R |
| 3,960,510 | 6/1976 | Sergeys | 252/477 R |

Primary Examiner—W. J. Shine
Attorney, Agent, or Firm—Flehr, Hohbach, Test, Albritton & Herbert

[57] ABSTRACT

A system and process for forming a catalytic bed in which the active catalytic material is formed with an enhanced surface area and secure adhesion onto a support structure. The system is formed by a process in which a liquid solution of a salt which is decomposable into a refractory oxide is applied to a support structure. The solution is dried to remove the solvent and, following decomposition of said salt, an active catalytic material is impregnated by applying onto the surface a soluble compound comprised of a noble metal or a catalytic oxide-forming metal. The structure is calcined to activate the catalytic material.

16 Claims, 1 Drawing Figure

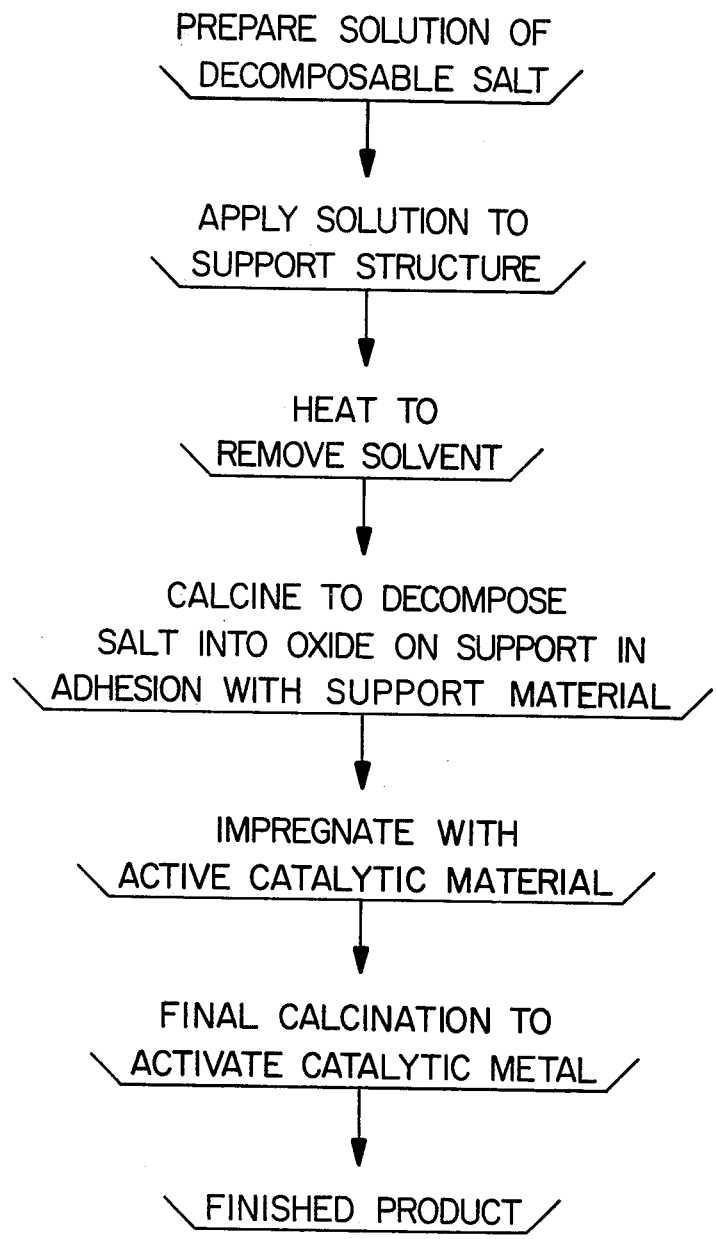
FIG_1

CATALYTIC SYSTEM AND PROCESS FOR PRODUCING IT

The invention described herein was made in the course of, or under, a contract with the Environmental Protection Agency.

This invention in general relates to catalytic beds and in particular relates to the formation of a catalytic bed with a relatively large catalytic surface area and with good adhesion of the active catalytic material onto the bed.

In many high temperature catalyst systems, e.g. for use in fuel combustors, the unitary catalytic support structure has a relatively small surface area. An example of an existing catalytic structure of this nature is the honeycomb catalytic bed sold under the trademark Torvex. To increase the catalytic surface area it is conventional to apply onto the surface a coating of a high surface area material on which the active catalytic material is then deposited. A process conventionally used for this purpose is slip coating.

In the slip coating process a slurry is prepared of the high surface area material, e.g. alumina, with a liquid such as water. It is desirable for good adhesion that the slurry particles should be smaller than the size of the pores in the support structure. The slurry is then dried leaving a wash coat of the particles. Adhesion of the wash coat is improved by calcining the coated support. The active catalytic material is impregnated onto the wash coat.

Even with good adherence of the wash coat to the support surface, some particles of the coating can flake and blow off during operation in a combustor. The result is that the flakes which blow off carry away adhering catalytic material which reduces effectiveness of the catalytic bed and, in gas turbine applications, can damage the turbine blades. With less perfect adherence, major portions of the wash coat can blow off at high velocity flow conditions.

It is a general object of the invention to provide a new process for making a catalytic system for use in combustion applications which obviates problems and limitations associated with existing catalytic systems.

Another object is to provide a catalytic system of the type described having a relatively large catalytic surface area to produce high combustion efficiencies.

Another object is to provide a catalytic system of the type described in which the active catalytic material is deposited within cavities of the support structure to obviate problems associated with flaking off of catalytic material during operation.

Another object is to provide a simple and effective process for making a catalytic bed in which the active catalytic material is in good adhesion on the bed and has a relatively large surface area for efficient combustion of gases in a combustor.

The invention in summary includes a process for forming a catalytic bed by applying to a porous support structure a liquid solution of a salt which is decomposable into a refractory oxide, drying the solution to remove the solvent, decomposing the salt into the oxide, impregnating the surface with an active catalytic material, and calcining. The resulting catalytic system comprises the refractory oxide and catalytic material with an enhanced surface area incorporated within the support structure.

The foregoing and additional advantages and features of the invention will appear from the following description in which the several embodiments have been set forth in detail in association with the accompanying drawing.

The single FIGURE of the drawing is a flow chart illustrating the process of the invention.

The process of the invention has application in forming catalytic systems or beds for use in a wide range of applications where it is desired to provide exposure of combustible gases over a relatively large area of active catalytic material. Examples of such catalytic systems are for use in fuel combustors having a unitary catalyst support, such as a cellular or honeycomb structure disposed in a combustion chamber.

The process of the invention as illustrated in the flow chart of the FIGURE includes the preparation of a liquid solution of a salt or mixture of salts of the type which decomposes to form a refractory oxide(s). The following table lists salts which are preferred for use in the process together with the oxides which are formed upon decomposition.

| Salt | Oxide |
| --- | --- |
| $ZrO(NO_3)_2$ (Zirconyl Nitrate) | $ZrO_4$ (Zirconia) |
| $Th(NO_3)_4 \cdot 3H_2O$ (Thorium Nitrate) | $ThO_2$ (Thoria) |
| $Ce(NO_3)_3$ (Cerium Nitrate) | $CeO_2$ (Ceria) |
| $Mg(NO_3)_2$ (Magnesium Nitrate) | $MgO$ (Magnesia) |
| $La(NO_3)_3$ (Lanthanum Nitrate) | $La_2O_3$ (Lanthana) |
| $Al(C_2H_3O_2)_3$ Aluminum Acetate) | $Al_2O_3$ (Alumina) |
| $Al_2(SO_4)_3$ (Aluminum Sulfate) | $Al_2O_3$ (Alumina) |

Ordinarily the salt or salts are decomposed by heating in air. However, in the case of salts such as acetates, it is often advantageous to limit the oxygen content of the calcination air so as to limit the temperature rise resulting from oxidation of the organic portion of said salts. Acetates are preferred salts but typically require decomposition to the oxide using air depleted in oxygen ($\simeq$1-10% oxygen) to control temperature rise from burning of evolved organics.

The decomposable salt is mixed into solution with a suitable compatible solvent, e.g. water for salts such as aluminum sulfate or zirconyl nitrate. Preferably the concentration of salt in the solution is in the range of 5% to 50% by weight. Satisfactory results are obtained with 20% by weight concentrations of zirconyl nitrate in solutions with water.

The solution of the decomposable salt is then applied to a porous support structure, preferably a ceramic, by suitable means such as immersing the structure in a bath of the solution. The structure is removed from the bath, drained, and then dried to remove the solvent. Where the solvent is water the drying step preferably is carried out by heating the support structure by means such as an oven to a temperature of about 110° C. for one hr. or longer, such as 10 to 12 hrs.

After drying, the support is calcined to decompose the salt by heating to a temperature above the decomposition temperature of the salt.

After the decomposition step the support structure is impregnated with an active catalytic material. For example, the catalytic material may be impregnated by applying a soluble compound of a noble metal such as platinum, rhodium, palladium or iridium. Suitable compounds for this purpose include noble metal halides such as chloroplatinic acid, palladium chloride, rhodium trichloride or iridium tetrachloride. The catalytic material may also be impregnated by applying a soluble compound yielding a metal oxide such as cobalt oxide, nickel oxide, chromium oxide, or manganese oxide. Suitable compounds for this purpose include cobalt nitrate, nickel nitrate, chromium nitrate, and manganese nitrate. The concentration of the soluble compound is selected depending upon the desired catalytic loading on the finished catalyst.

The treated support structure on which the decomposable salt has been deposited and then decomposed may be immersed in a bath of the impregnating solution and then removed, leaving the treated support wetted with solution. Alternately, the treated support may be sprayed with a predetermined amount of solution.

In the next step of the process the support structure is dried and then calcined to decompose the catalytic metal compound. The drying and calcining operations could be combined in a multiple temperature level furnace, such as a tunnel furnace. The calcining step is carried out by heating in an oven to a temperature above the decomposition temperature of the compound used, e.g. above about 500° C. for chloroplatinic acid.

Following calcining the resulting catalytic bed may be employed in a fuel combustion system, e.g. in a combustion chamber of a gas turbine or for application in firetube and watertube boilers. The resulting catalytic surface of the system is characterized in that the refractory oxide is deposited within the pores of the supporting surface and provides a relatively large surface area for exposing the catalytic material to the gases for high combustion efficiency.

Examples of the use and operation of the invention are as follows.

EXAMPLE I

A solution of zirconyl nitrate salt with water is prepared in the concentration of 28% by weight of the salt. A cellular support structure of ceramic material is immersed in the solution, withdrawn and placed in an oven. The support structure is heated in the oven to a temperature of about 110° C. and held at temperature for 2 hours to drive the solvent off leaving a deposit of the salt over and in the pores of the surface. The support structure is removed from the oven and calcined in a furnace at 800° C. for 1 hour. The calcined structure is cooled and then sprayed with a solution prepared by dissolving an amount of chloroplatinic acid equal to 0.5% by weight of the support structure weight in water sufficient to produce an amount of solution just equal to the pore volume of the surface area enhanced support. The treated support is dried in a 110° C. oven for 2 hours and then calcined at a temperature of 500° C. for 1 hour. The result after calcining is an active deposit of platinum on the zirconia within the pores of the structure.

EXAMPLE II

A solution of thorium nitrate salt with water is prepared in the concentration of 38% by weight of the salt. A cellular support structure of ceramic material is immersed in the solution, withdrawn and placed in an oven. The support structure is heated in the oven to a temperature of about 110° C. and held at temperature for one hour to drive the solvent off leaving a deposit of the salt over and in the pores of the surface. The support structure is removed from the oven and calcined in a furnace at 800° C. for one hour. The calcined support is then wetted with a solution of water containing 2% by weight chloroplatinic acid and 0.8% by weight iridium tetrachloride. The support structure is dried in a 110° C. oven, and then calcined at a temperature of 600° C. for 2 hours. The result after calcining is a catalytically active deposit of precious metals on the thoria within the pores of the structure.

EXAMPLE III

A mixed salt solution with water is prepared in the concentration of 17% by weight zirconyl nitrate plus 16% by weight magnesium nitrate. A cellular support structure of ceramic material is immersed in the solution, withdrawn and placed in an oven. The support structure is heated in the oven to a temperature of about 110° C. and held at temperature for two hours to drive the solvent off leaving a deposit of the salt over and in the pores of the surface. The support structure is removed from the oven and calcined in a furnace at 650° C. for one hour. The calcined structure is cooled and then sprayed with a solution prepared by dissolving an amount of chloroplatinic acid equal to 0.5% by weight of the support structure weight in water sufficient to produce an amount of solution just equal to the pore volume of the surface area enhanced support. The treated support is dried in a 110° C. oven for 2 hours and then calcined at a temperature of 500° C. for one hour. The result after calcining is an active deposit of platinum on the zirconia and magnesia within the pores of the structure.

EXAMPLE IV

A solution of thorium nitrate salt with water is prepared in the concentration of 38% by weight of the salt. A cellular support structure of ceramic material is immersed in the solution, withdrawn and placed in an oven. The support structure is heated in the oven to a temperature of about 110° C. and held at temperature for one hour to drive off the solvent leaving a deposit of the salt over and in the pores of the surface. The support structure is removed from the oven and calcined in a furnace at 800° C. for one hour. The calcined support is cooled and then wetted with a solution of water containing 50% by weight of cobalt nitrate. The support structure is then dried in a 110° C. oven and then calcined at a temperature of 830° C. for two hours. The result after calcining is a catalytically active deposit of 3% cobalt oxide on the thoria within the pores of the structure.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. In a process for forming a catalytic bed with a porous support structure of a low surface area ceramic, the steps of applying onto the surface of the support structure a mixture consisting essentially of a solution of a solvent and a salt which decomposes to form a refractory oxide, drying the solution to remove the solvent therefrom, decomposing the salt into the oxide leaving a refractory oxide adhering within the surface pores of the support structure, impregnating the surface with a solution of an active catalytic material, and drying the last-mentioned solution to remove the solvent therefrom.

2. A process as in claim 1 in which the salt is comprised of an element selected from the group consisting of zirconium, thorium, cerium, magnesium, lanthanum and aluminum.

3. A process as in claim 1 in which the salt is a nitrate.

4. A process as in claim 1 in which the salt is a sulfate.

5. A process as in claim 1 in which the salt is an acetate.

6. A process as in claim 1 in which the step of decomposing the salt is carried out by heating the applied salt above its decomposition temperature to form the refractory oxide.

7. A process as in claim 1 in which the step of impregnating the surface with the catalytic material is carried out by applying a solution of a halide of a noble metal to the surface of the support structure onto which the solution of a salt is applied, and drying to remove the solvent from the metal halide solution, and the step of decomposing the salt is carried out by heating the applied salt to a temperature which decomposes the salt into said oxide.

8. A process as in claim 1 in which the salt is selected from the group consisting of zirconyl nitrate, thorium nitrate and aluminum nitrate, said salt is applied onto the surface in a solution with a liquid solvent, the step of impregnating the surface with the catalytic material is carried out by applying to the surface a metal halide in which the metal is selected from the group consisting of platinum, palladium and iridium, and the applied salt is heated to above the decomposition temperature of the salt to thermally decompose the same to form said oxide.

9. A catalytic system comprising a porous support structure of a low surface area ceramic, a refractory oxide formed in the surface pores of the support structure by the method of applying onto the surface of the support a mixture consisting essentially of a solution of a solvent and a salt which is decomposable into the oxide, drying the solution to remove the solvent therefrom, and decomposing the salt within the surface pores to form the oxide, and an active catalytic material adhering to the oxide.

10. A catalytic system as in claim 9 in which the salt is decomposed by heating the same to above its decomposition temperature.

11. A catalytic system as in claim 9 in which the salt is comprised of an element selected from the group consisting of zirconium, thorium, aluminum, lanthanum, cerium, and magnesium.

12. A catalytic system as in claim 9 in which the salt is selected from the group consisting of zirconyl nitrate, thorium nitrate and aluminum sulfate.

13. A catalytic system as in claim 9 in which the catalytic material is formed on the oxide by applying to the surface a metal halide in which the metal is a noble metal, and heating the metal halide to a temperature which decomposes the halide into the noble metal adhering to the oxide.

14. A catalytic system as in claim 13 in which the metal is selected from the group consisting of platinum, iridium, rhodium, and palladium.

15. A catalytic system as in claim 9 in which the catalytic material is formed on the oxide by applying to the surface a soluble compound of a metal and converting said compound to the metal oxide.

16. A catalytic system as in claim 15 in which the metal oxide is selected from the group consisting of cobalt oxide, nickel oxide, chromium oxide and manganese oxide.

* * * * *